United States Patent [19]

Furutsu

[11] Patent Number: 5,528,332
[45] Date of Patent: Jun. 18, 1996

[54] CAMERA HAVING IN-FOCUS STATE INDICATING DEVICE

[75] Inventor: Etsuro Furutsu, Kanagawa-ken, Japan

[73] Assignee: Canon Kabushiki Kaisha, Tokyo, Japan

[21] Appl. No.: 170,784

[22] Filed: Dec. 21, 1993

[30] Foreign Application Priority Data

Dec. 28, 1992 [JP] Japan ................................... 4-358568

[51] Int. Cl.⁶ .......................... G03B 13/36; G03B 17/18
[52] U.S. Cl. ...................... 354/409; 354/467; 354/195.13
[58] Field of Search ..................................... 354/409, 465, 354/467, 471, 473, 474, 195.13

[56] References Cited

U.S. PATENT DOCUMENTS

| | | | |
|---|---|---|---|
| 4,117,325 | 9/1978 | Holle et al. | 354/409 |
| 4,142,788 | 3/1979 | Matsumoto et al. | 354/409 |
| 4,146,316 | 3/1979 | Osawa | 354/409 |
| 4,214,824 | 7/1980 | Stemme et al. | 354/409 |
| 4,286,850 | 9/1981 | Aoki | 354/409 |
| 4,288,151 | 9/1981 | Matsumoto et al. | 354/409 |
| 4,319,238 | 3/1982 | Ogasawara et al. | 354/409 |
| 4,329,032 | 5/1982 | Aoki et al. | 354/409 |
| 4,361,390 | 11/1982 | Yamada | 354/409 |
| 4,443,086 | 4/1984 | Hosoe et al. | 354/409 |
| 4,466,726 | 8/1984 | Nakajima | 354/409 |
| 4,473,284 | 9/1984 | Hiramatsu et al. | 354/409 |
| 4,491,403 | 1/1985 | Sakai et al. | 354/409 |
| 4,512,646 | 4/1985 | Kitaura et al. | 354/409 |
| 4,777,504 | 10/1988 | Akada et al. | 354/400 |

*Primary Examiner*—Russell E. Adams
*Attorney, Agent, or Firm*—Fitzpatrick, Cella, Harper & Scinto

[57] ABSTRACT

Apparatus for use with a focus detecting device arranged to repeatedly detect a state of focus, or for use with a camera having such a focus detecting device includes a processor for determining whether the state of focus detected by the focus detecting device is an in-focus state or an out-of-focus state. An indicator provides an indication of the in-focus state in response to the processor determining that the in-focus state has been detected. The processor causes the indication provided by the indicator to vary on the basis of a number of times that the in-focus state has been determined by the processor.

38 Claims, 7 Drawing Sheets

FIG.3(a) OUTPUT WAVEFORM OF PWM AT DUTY 50%

FIG.3(b) OUTPUT WAVEFORM OF PWM AT DUTY 10%

CAMERA HAVING IN-FOCUS STATE INDICATING DEVICE

BACKGROUND OF THE INVENTION

1. Field of the Invention

This invention relates to an improvement in a focus detecting device having focus detecting means for detecting a state of focus and focusing state indicating means for indicating a result of the detection made by the focus detecting means.

2. Description of the Related Art

Control modes heretofore employed for automatic focus adjustment by cameras include a mode called the one-shot AF (automatic focusing) mode in which a focus detecting process and a driving process of focus adjusting means are repeated until an in-focus state is obtained. And the driving process of the focus adjusting means is brought to a stop once the in-focus state is obtained. Another control mode is the servo AF mode in which, with the focus detecting process and the driving process of the focus adjusting means repeated until an in-focus state is obtained like in the one shot AF mode, these processes are further performed even after the detection of the in-focus state.

In respect of means for informing the operator of the camera, or a person or persons who are objects of shooting, of an in-focus state upon detection of the in-focus state as a result of focus detection, there have been employed a method of indicating attainment of the in-focus state by a sound generator mounted on the camera or a method of indicating it by a light emitting element such as an LED disposed within a viewfinder. An arrangement made to permit a shutter release only when an in-focus state is attained and to inhibit any shutter release in the event of an out-of-focus state may be also considered to be a sort of method of indicating an in-focus state.

In the servo AF mode mentioned above, an out-of-focus state, or a defocused state, is obtained in a case where a distance between the camera and the object suddenly changes or where the object comes outside of a focus detecting range. In such a case, the camera operator or the persons who are the objects of shooting must be informed of the out-of-focus state by the above-stated methods of indication. Further, when an in-focus state is attained again by a panning operation on the camera or by driving the focus adjusting means, it is necessary to indicate again that the in-focus state is reattained.

However, in the event of a fast moving object or when using a telephoto lens that causes excessive camera shaking due to hand vibrations, in-focus and out-of-focus states frequently alternate with each other to cause the state of indication by focus indicating means to become a nuisance. Such a state of indication is offensive to the eye in a case where it is effected by a light, or to the ear where it is effected by a sound, and thus hinders concentration of attention on a shooting operation. Especially in the case of indicating means for indicating by a sound, it tends to give a disagreeable feeling to many people as the sound propagates over the whole neighborhood of the camera.

To avoid this trouble, a method of generating no in-focus state indicating sound in the servo AF mode has been contrived, as disclosed in U.S. Pat. No. 4,777,504. The method, however, completely eliminates the in-focus state indicating sound and, therefore, has presented a problem in that the camera operator cannot readily make a discrimination between in-focus and out-of-focus states.

SUMMARY OF THE INVENTION

One aspect of this invention resides in the provision of a focus detecting device which is arranged to be capable of informing the operator of a camera of an in-focus or out-of-focus state without offending the eye of the operator or without giving any disagreeable feeling to the people around the camera.

Another aspect of this invention resides in the provision of a focus detecting device which is provided with indication intensity varying means for varying the intensity of an indication of an in-focus state to be made by focus state indicating means, and indication intensity instructing means for instructing the indication intensity varying means to make the intensity of the indication weaker than a normal intensity in a case where a predetermined condition is satisfied, in such a manner that the intensity of the indication is weakened from the normal intensity if the predetermined condition, such as a condition that the in-focus state is attained for the second or later time, is satisfied.

A further aspect of this invention resides in the provision of a focus detecting device which is provided with indication frequency varying means for varying the frequency of an indication of an in-focus state to be made by focus state indicating means, and indication frequency instructing means for instructing the indication frequency varying means to lower the frequency of the indication in a case where a predetermined condition is satisfied, for example, in such a manner that the indication of the in-focus state is made once for four times of attainment of the in-focus state, instead of a normal frequency of making the indication of the in-focus state five times in a predetermined period of time, if the predetermined condition, such as that the in-focus state is attained for the fourth or later time, is satisfied.

These aspects and features of this invention will become apparent from the following detailed description of embodiments thereof taken in connection with the accompanying drawings.

DETAILED DESCRIPTION OF THE PREFERRED EMBODIMENTS

This invention is described in detail through embodiments thereof shown in the drawings as follows:

(First Embodiment)

Figure 1:
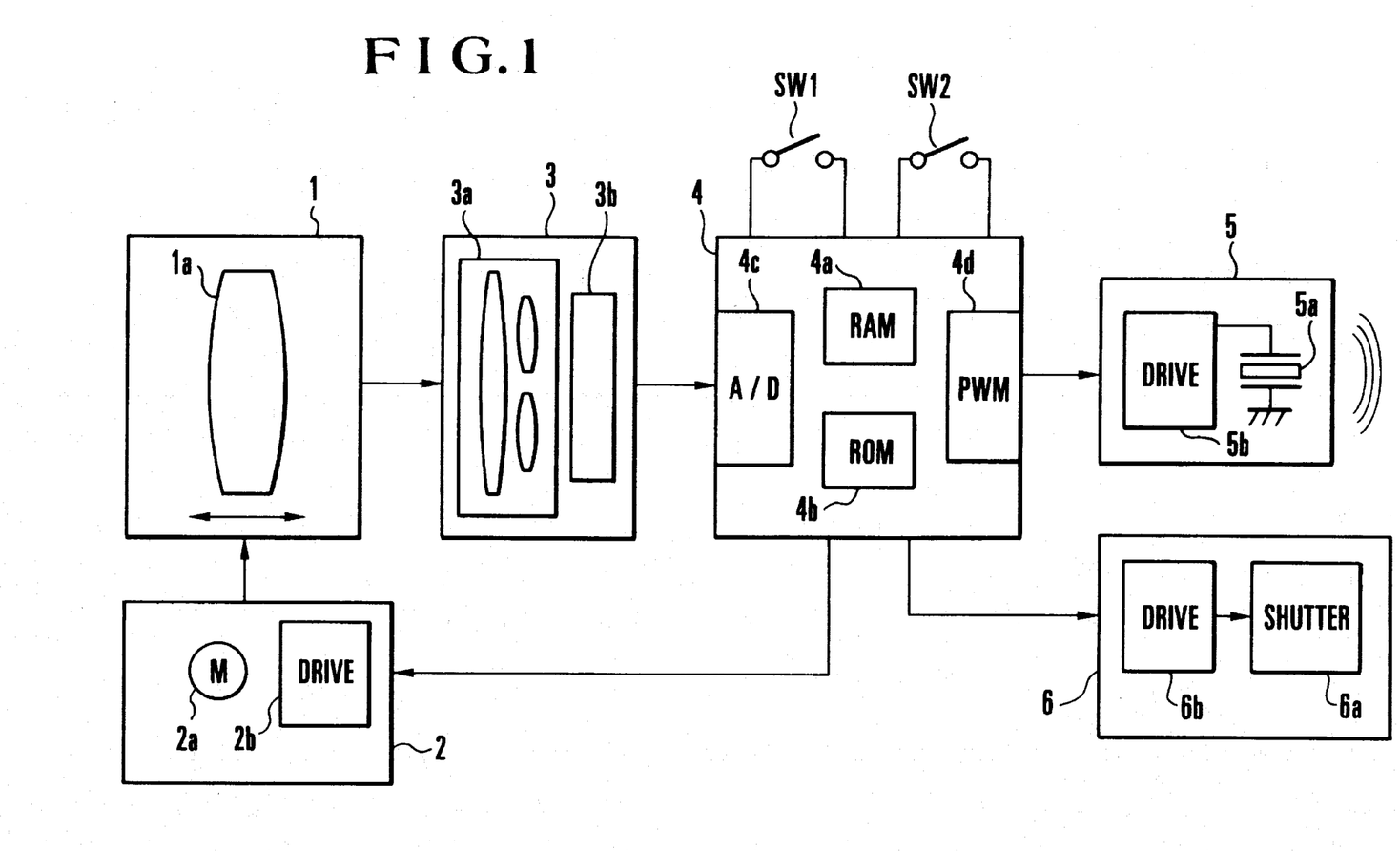
FIG. 1 is a block diagram showing the arrangement of essential parts of a camera which is arranged as a first embodiment of this invention.

FIG. 1 shows in a block diagram the arrangement of parts of a camera which is arranged as a first embodiment of this invention. Referring to FIG. 1, a photo-taking lens unit 1 includes a focus adjusting lens 1a. A focus adjustment driving device 2 includes a focus adjustment driving motor 2a and a driving control circuit 2b which controls the driving action of the motor 2a. A focus detecting unit 3 includes a beam splitter 3a and a focus detecting sensor array 3b.

A camera controlling microcomputer 4 includes a CPU (not shown), a RAM 4a which stores information of varisus kinds, a ROM 4b in which an action controlling program is written, an A/D converter 4c which is provided for receiving an analog signal outputted from the focus detecting sensor array 3b and a PWM control circuit 4d. The PWM control circuit 4d corresponds to indication intensity varying means. An indication intensity deciding part of the program written in the ROM 4b corresponds to indication intensity deciding means.

A switch SW1 is provided for starting an automatic focusing action and is arranged to be turned on by a first stroke of operation on a release button. A switch SW2 is provided for starting a release action and is arranged to be turned by a second stroke of operation of the shutter release button. These switches SW1 and SW2 are respectively connected to the microcomputer 4.

Indicating means 5 is arranged to indicate an includes a sound generator 5a and a driving circuit 5b which is arranged to drive the sound generator 5a. An exposure control device 6 includes a shutter 6a and a shutter driving circuit 6b which drives the shutter 6a.

Figure 2:
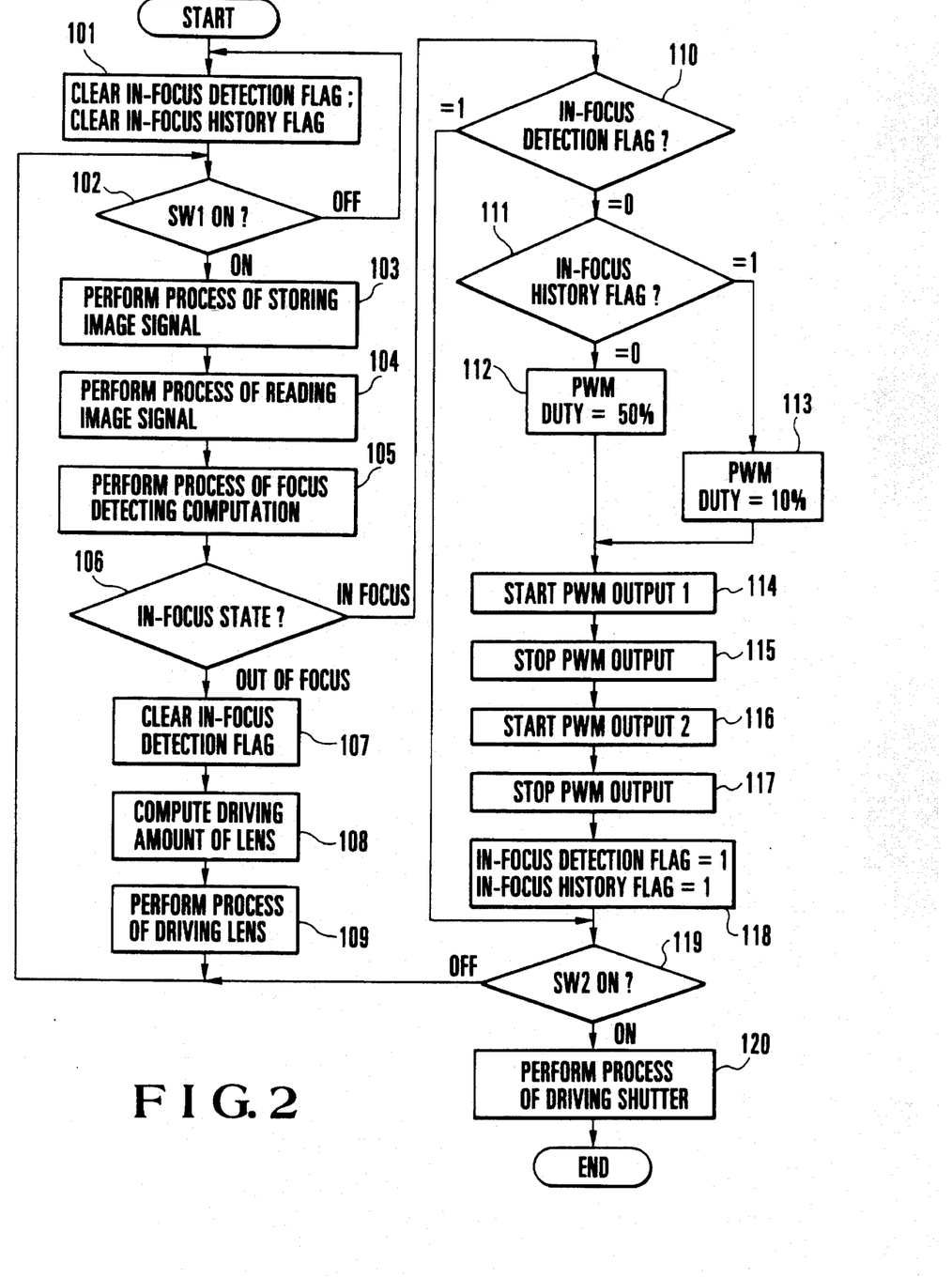
FIG. 2 is a flow chart showing the operation of the camera shown in FIG. 1.

FIG. 2 is a flow chart showing the operation of the camera arranged as described above. Referring to the flow chart, when a power supply switch which is not shown is turned on, a step 101 is executed. At the step 101, an in-focus detection flag and an in-focus history flag which are allocated to the specific addresses of the RAM 4a of the microcomputer 4 are cleared and set at "0".

The in-focus detection flag is arranged to be set every time the processes of focus detection are performed once. The in-focus history flag is arranged to store the fact that an in-focus state is attained before the current point of time after the switch SW1 provided for starting the automatic focusing action is turned on.

At a step 102, the microcomputer 4 makes a check for the state of the switch SW1 provided for starting the automatic focusing action. If the switch SW1 is found to be not in its on-state, the flow of operation comes back to the step 101. If the switch SW1 is found to be in its on-state, the flow comes to a step 103. At the step 103, the microcomputer 4 instructs the focus detecting sensor array 3b to store an incident image coming through the photo-taking lens unit 1 and the beam splitter 3a until a predetermined condition is satisfied. This predetermined condition is generally a condition which is either that the level of an image signal stored by the sensor array 3b must be at least a predetermined value or that the storing time is at least a predetermined length of time.

At a step 104, the microcomputer 4 receives a group of analog image signals outputted from the focus detecting sensor array 3b through the A/D converter 4c and stores them at predetermined addresses of the RAM 4a. At a step 105, the microcomputer 4 performs a focus detecting computation by using the data of image signals stored by the step 104. To be more specific, the step 105 is executed as follows: Assuming that the image signals split by the beam splitter 3a respectively carry an image A and an image B, a correlation between the two image signals is computed by shifting these image signals in opposite directions. Then, the number of shifts by which the amount of the correlation is brought to an extreme value corresponds to an amount of focus deviation.

At a step 106, a check is made to find if the amount of focus deviation obtained by the step 105 is less than a predetermined focal depth. If so, an in-focus state is deemed to have been attained and the flow comes to a step 110. If the amount of focus deviation is found to exceed the predetermined focal depth, it is considered to represent an out-of-focus state and the flow comes to a step 107. At the step 107, the focus detection flag is cleared to "0" as the result of the check is determined to be representing an out-of-focus state.

At a step 108, the focus deviation amount which has been obtained by the focus detection computing process of the step 105 is converted, by using the defocus sensitivity of the focus adjusting lens 1a, into a driving amount to which the focus adjusting lens 1a is to be driven. At a step 109, the microcomputer 4 sends information on the above-stated lens driving amount to the focus adjustment driving device 2. In accordance with this, the driving control circuit 2b controls and causes the focus adjustment driving motor 2a to drive the focus adjusting lens 1a as much as the amount set.

After the step 109, the processes of focus detection are performed again from the step 102.

If the amount of focus deviation is found to be less than the predetermined focal depth at the step 106, the flow comes to the step 110 as mentioned above. At the step 110, since an in-focus state is judged to have been attained by the check made for an in-focus state at the step 106, the focus detection flag is checked for confirmation as to whether the result of previous focus detection made the last time shows an in-focus state or an out-of-focus state. If the in-focus detection flag is found to be at "1" (for an in-focus state detected the last time), the flow comes to a step 119. If the in-focus detection flag is found to be at "0" (for an out-of focus state detected the last time), the flow comes to a step 111.

At the step 111, the in-focus history flag is checked for confirmation as to whether any in-focus state has been detected after the start of the automatic focusing action (after the switch SW1 is turned on). If the in-focus history flag is found to be at "1", thus indicating previous detection of an in-focus state, i.e., an in-focus indication previously made, the flow branches to a step 113. If the in-focus history flag is found to be at "0", thus indicating that no in-focus state has been detected, i.e., no in-focus indication has been made in the past, the flow comes to a step 112. At the step 112, the microcomputer 4 sets the output frequency of the PWM control circuit 4d disposed within the microcomputer 4 at 4 KHz and sets the duty ratio of it at 50%.

The duty ratio is a ratio between an ON output of a signal and an OFF output of the signal and can be expressed as: duty ratio (%)=(ON output time/output time of one cycle)× 100. In the case of this embodiment, the duty ratio means that the output sound pressure of the sound generator 5a is set at its maximum level.

At a step 113, the microcomputer 4 sets the output frequency of the built-in PWM control circuit 4d at 4 KHz and sets its duty ratio at 10% to lessen the output sound pressure of the sound generator 5a.

At a step 114, the microcomputer 4 begins to supply the PWM output (at the duty ratio of 50% or 10%) of the built-in PWM control circuit 4d to the driving circuit 5b. In accordance with this, a driving signal is applied from the driving circuit 5b to the sound generator 5a. As a result, an in-focus indication begins to be made by a sound. The microcomputer 4 allows the in-focus indication to be outputted just for a period of 32 ms. At a step 115, the microcomputer 4 brings the PWM output outputted by the step 114 to a stop to suspend the in-focus indication by sound. This suspension of the in-focus indication is allowed to last for 32 ms.

At a step 116, the microcomputer 4 begins to supply the PWM output of the PWM control circuit 4d to the driving circuit 5b like at the step 114. This causes the driving circuit 5b to apply a driving signal to the sound generator 5a and an in-focus indication by sound begins. The microcomputer 4 again allows the in-focus indication to be made for 32 ms. At a step 117, the microcomputer 4 brings the PWM output outputted at the step 116 to a stop to terminate the in-focus indication by sound.

Figure 3A:
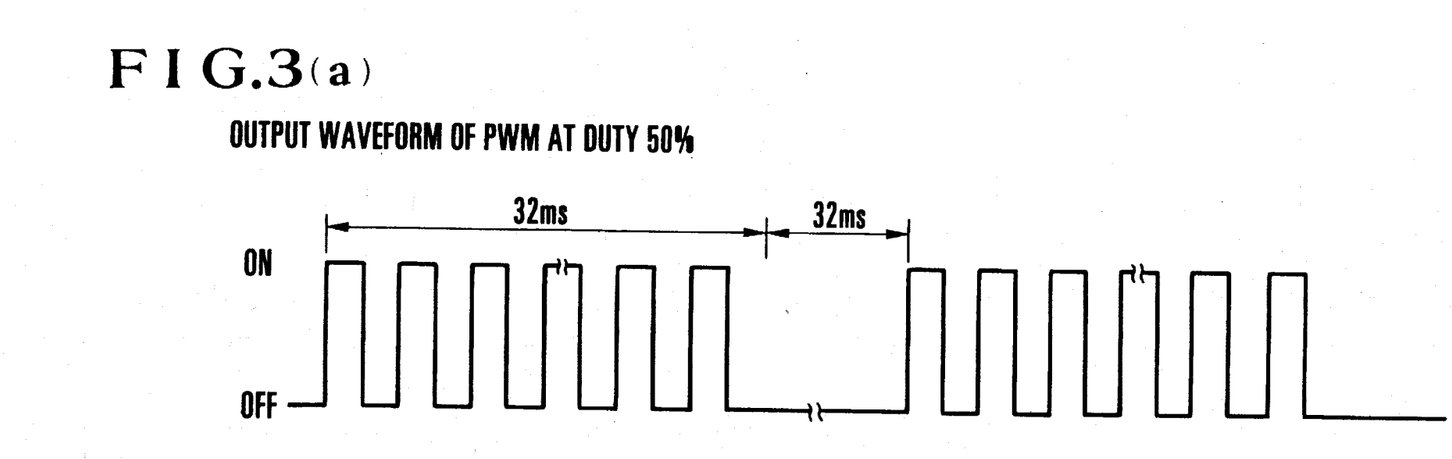
FIGS. 3(a) and 3(b) show the waveforms of PWM outputs obtained by varying the intensity of an indication to be made by the first embodiment of this invention.
Figure 3B:
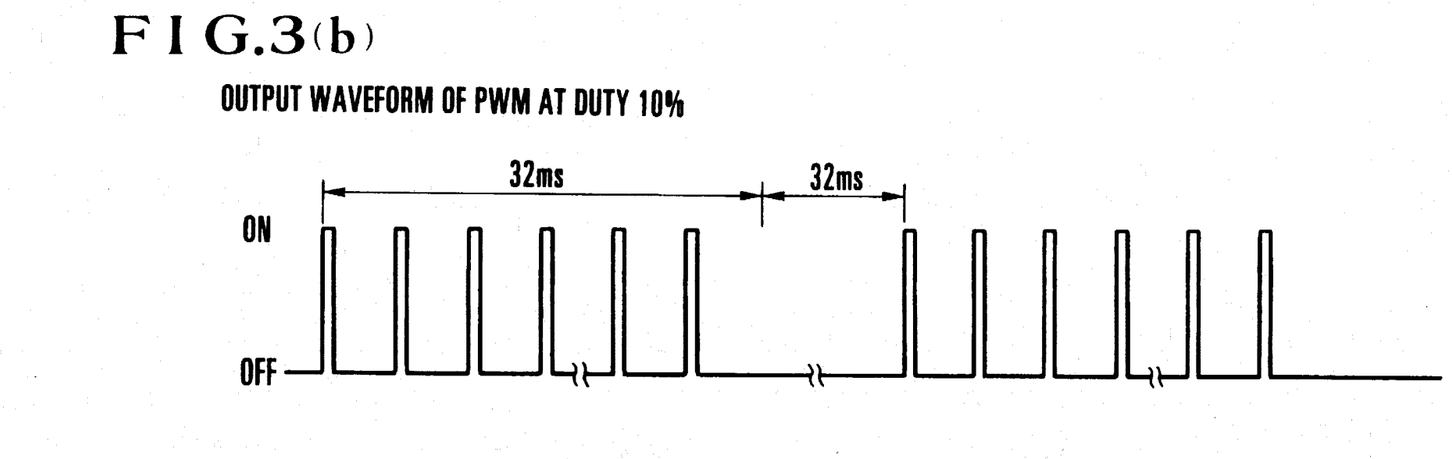

The PWM output waveforms obtained by the above-stated steps 114 to 117 are as shown in FIGS. 3(a) and 3(b). An imitation sound of these outputs becomes "pip, pip, - - - ". At a step 118, the microcomputer 4 sets both the in-focus detection flag and the in-focus history flag at "1" and stores them. At a step 119, the microcomputer 4 makes a check for the state of the switch SW2 which is provided for initiating a release action. If the switch SW2 is not in its on-state, the flow branches to the step 102 to repeat the processes of focus detection. If the switch SW2 is found to be in its on-state, the flow comes to a step 120 to allow the release action to begin.

At the step 120, the microcomputer 4 sends a shutter driving instruction signal to the shutter driving circuit 6b which is disposed within the exposure control device 6. The shutter 6a is then driven by the shutter driving circuit 6b and a predetermined part of a film is exposed to the light of an object image.

Since the embodiment is arranged in the manner described above, an indication is made at the duty ratio of 50% when an in-focus state is detected for the first time. After that, further indication is inhibited if the in-focus state continues. If the in-focus state comes to change to an out-of-focus state and, after that, the in-focus state is attained again, the in-focus indication is made at the duty ratio of 10%. In other words, according to the arrangement of the first embodiment, an in-focus indication is made at the duty ratio of 10% if it is to be made after an in-focus state has been attained before.

(Second Embodiment)

Figure 4:
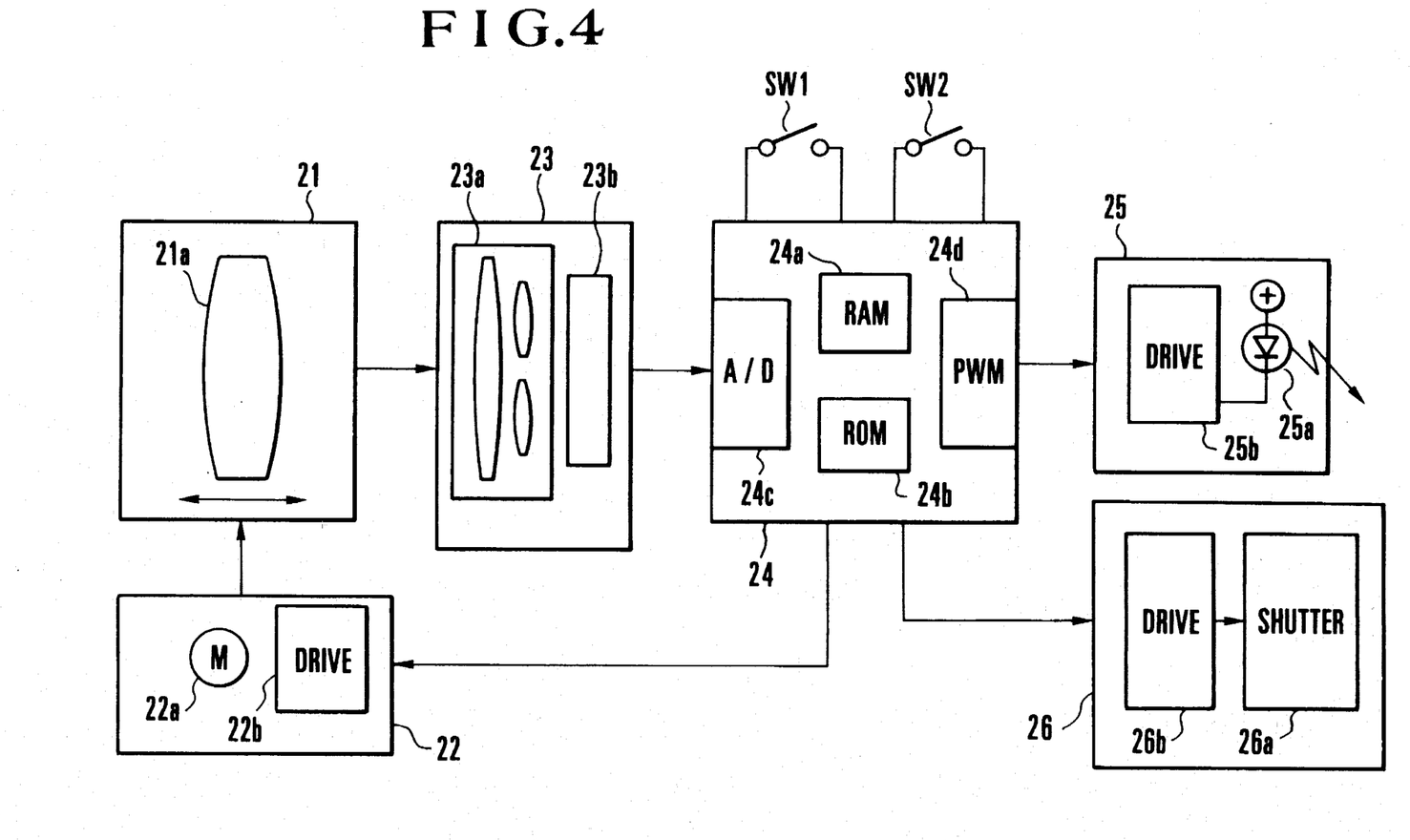
FIG. 4 is a block diagram showing the arrangement of essential parts of a camera which is arranged as a second embodiment of this invention.

FIG. 4 is a block diagram showing the arrangement of parts of a camera arranged as a second embodiment of this invention. Referring to FIG. 4, a photo-taking lens unit 21 includes a focus adjusting lens 21a. A focus adjustment driving device 22 includes a focus adjustment driving motor 22a and a driving control circuit 22b which controls the driving action of the motor 22a. A focus detecting unit 23 includes a beam splitter 23a and a focus detecting sensor array 23b.

A camera controlling microcomputer 24 includes therein a CPU (not shown), a RAM 24a which is arranged to store information of varisus kinds, a ROM 24b in which an action controlling program is written, an A/D converter 24c which is provided for receiving analog signals outputted from the above-stated sensor array 23b, and a PWM control circuit 24d. The PWM control circuit 24d corresponds to the indication intensity varying means mentioned in the foregoing. In the program which is written beforehand in the ROM 24b, a part of the program deciding the indication intensity corresponds to indication intensity deciding means.

A switch SW1 is provided for starting an automatic focusing action and is arranged to be turned on by a first stroke of operation of a release button. A switch SW2 is provided for starting a release action and is arranged to be turned on by a second stroke of operation of the release button. These switches SW1 and SW2 are respectively connected to the microcomputer 24.

Indicating means 25 is arranged to indicate an in-focus state by light and includes an LED 25 and an LED driving circuit 25b which is arranged to drive the LED 25a. An exposure control device 26 includes a shutter 26a and a shutter driving circuit 26b which is arranged to drive the shutter 26a.

Figure 5:
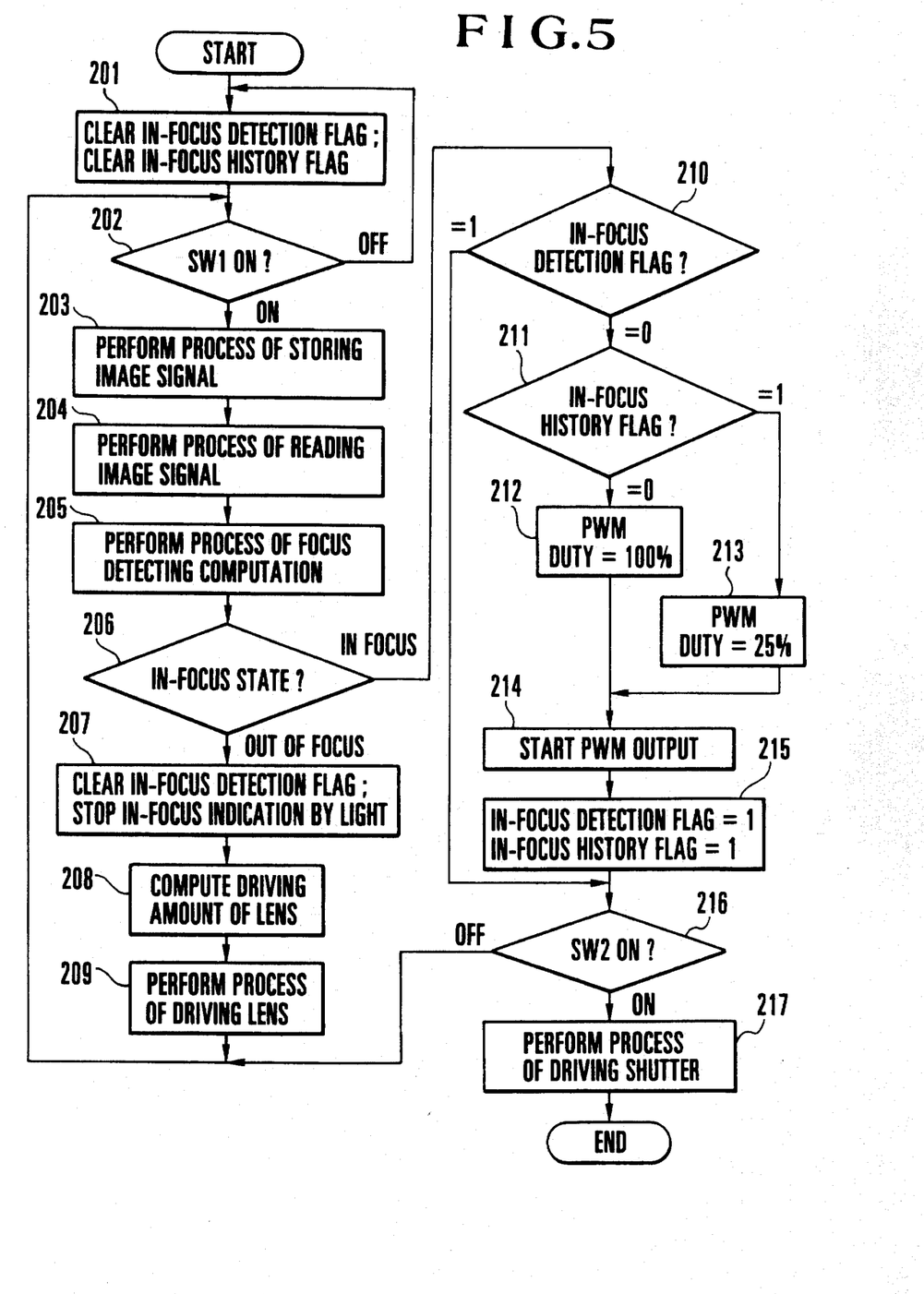
FIG. 5 is a flow chart showing the operation of the camera shown in FIG. 4.

FIG. 5 is a flow chart showing the operation of the camera arranged as described above. The operation is described with reference to the flow chart as follows: A step 201 begins when a power supply switch which is not shown is turned on. At the step 201, the microcomputer 24 clears an in-focus detection flag and an in-focus history flag allocated to specific addresses of the RAM 24a within the microcomputer 24 and sets them to "0". At a step 202, the microcomputer 24 makes a check for the state of the switch SW1 which is provided for starting the automatic focusing action. If the switch SW1 is not in its on-state, the flow of operation returns to the step 201. If the switch SW1 is in its on-state, the flow comes to a step 203.

At the step 203, the microcomputer 24 instructs the focus detecting sensor array 23b to store an incident image coming through the photo-taking lens unit 21 and the Beam splitter 23a until a predetermined condition is satisfied. At a step 204, the microcomputer 24 takes in a a group of analog image signals outputted from the focus detecting sensor array 23b through the A/D converter 24c and stores them at predetermined addresses of the RAM 24a.

At a step 205, the microcomputer 24 performs a focus detecting computation by using the image signal data stored by the step 204. At a step 206, an amount of focus deviation obtained by the step 205 is checked to find if the amount of focus deviation is less than a predetermined focal depth. If so, an in-focus state is considered to have been attained and the flow branches to a step 210. If the amount of focus deviation is found to exceed the predetermined focal depth, the flow comes to a step 207.

At the step 207, since the result of the check shows an out-of-focus state, the in-focus detection flag is cleared to "0". The PWM output of the PWM control circuit 24d is brought to a stop to terminate the light emission of the LED 25a caused by the LED driving circuit 25b. At a step 208, the amount of focus deviation computed by the focus detection computing process of the step 205 is converted, by using the defocus sensitivity of the focus adjustment lens 21a, into a driving amount to which the focus adjusting lens 21a is to be driven.

At a step 209, the microcomputer 24 sends information on the above-stated lens driving amount to the focus adjustment driving device 22. In accordance with this, the driving control circuit 22b controls the focus adjustment driving motor 22a. The focus adjusting lens 21a is driven as much as the amount set. After that, the flow comes back to the step 202 to perform again the focus detecting processes beginning with the step 202.

If the amount of focus deviation is found to be less than the predetermined focal depth by the step 206, an in-focus state is judged to have been attained and, as mentioned above, the flow branches to the step 210. At the step 210, with an in-focus state judged to have been attained by the step 206, the focus detection flag is checked for confirmation as to whether the result of previous focus detection made the last time shows an in-focus state or an out-of-focus state. If the in-focus detection flag is found to be at "1", the flow branches to a step 216. If the in-focus detection flag is found to be at "0", the flow comes to a step 211.

At the step 211, the in-focus history flag is checked for confirmation as to whether an in-focus state has been detected after the start of the automatic focusing action (after the switch SW1 was turned on). If the in-focus history flag is found to be at "1", the flow branches to a step 213. If the in-focus history flag is found to be at "0", the flow comes to a step 212.

At the step 212, the microcomputer 24 sets the output frequency of the PWM control circuit 24d disposed within the microcomputer 24 at 500 KHz and sets its duty ratio at 100%. This means that the quantity of light outputted from the LED 25a is maximized by this step. At the step 213, the microcomputer 24 sets the output frequency of the built-in PWM control circuit 24d at 500 KHz and sets the duty ratio at 25%. This means that the quantity of light outputted from the LED 25a is reduced.

At a step 214, the microcomputer 24 begins to supply the PWM output (at the duty ratio of 100% or 25%) of the built-in PWM control circuit 24d to the LED driving circuit 25b. In accordance with this, a driving signal is applied from the LED driving circuit 25b to the LED 25a and an in-focus indication by light begins.

At a step 215, the microcomputer 24 sets both the in-focus detection flag and the in-focus history flag at "1" and stores them. At the step 216, the microcomputer 24 checks the state of the switch SW2 which is provided for initiating a release action. If the switch SW2 is found to be not in its on-state, the flow comes back to the step 202 to repeat the processes of focus detection. If the switch SW2 is found in the on-state, the flow comes to a step 217 to allow a release action to begin. At the step 217, the microcomputer 24 sends a shutter driving instruction signal to the shutter driving circuit 26b disposed within the exposure control device 26. In accordance with this, the shutter driving circuit 26b drives the shutter 26a. A predetermined part of a film is then exposed to the light of an object image.

With the embodiment arranged as described above, an indication is made at the duty ratio of 100% for an in-focus state detected for the first time. With this in-focus state assumed to change to an out-of-focus state, an in-focus state detected again after the in-focus state first detected is indicated at the duty ratio of 25%.

(Third Embodiment)

Figure 6:
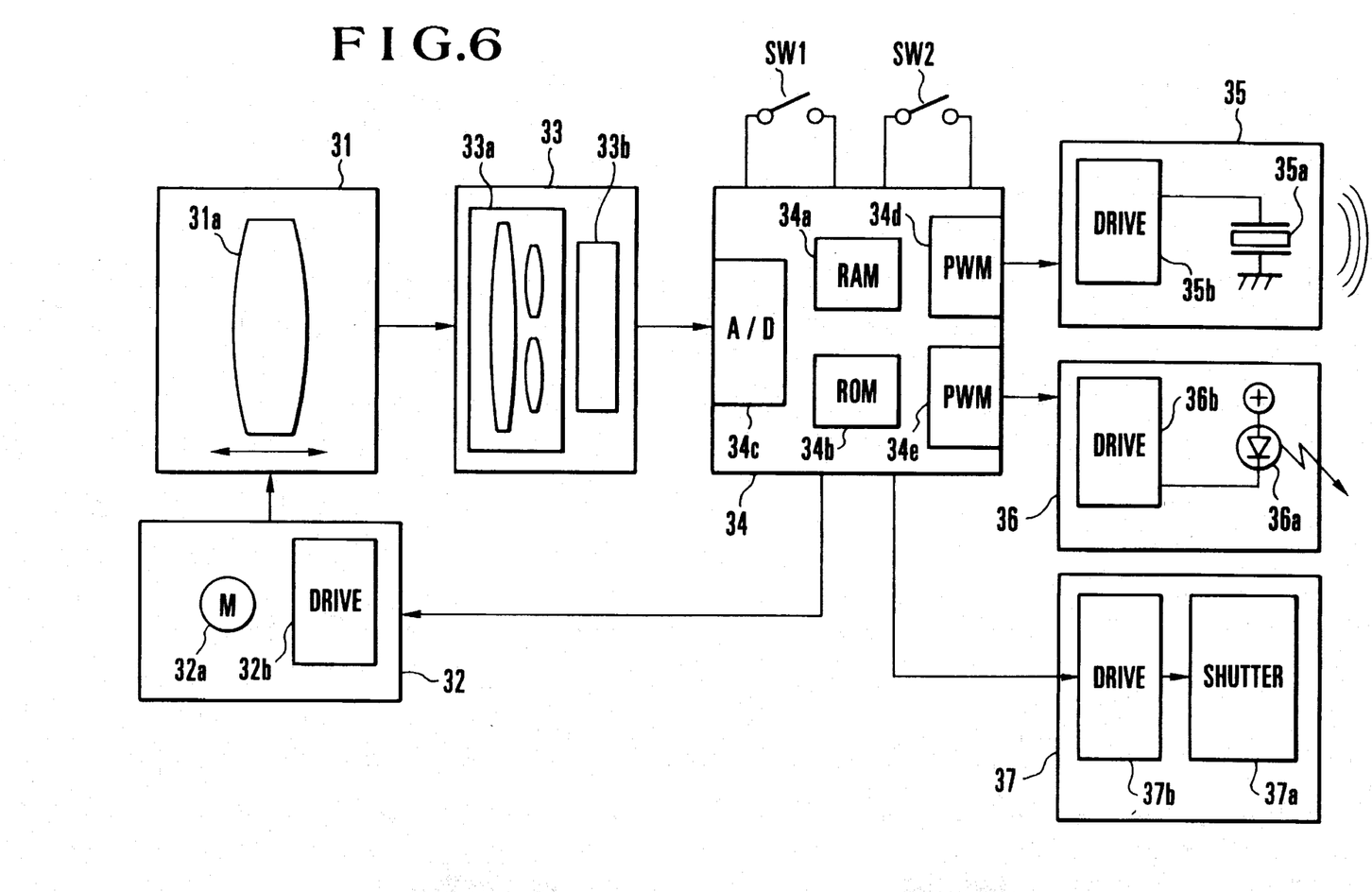
FIG. 6 is a block diagram showing the arrangement of essential parts of a camera which is arranged as a third embodiment of this invention.

FIG. 6 is a block diagram showing the arrangement of parts of a camera arranged as a third embodiment of this invention. In the case of the third embodiment, the camera is assumed to have both a mode of indicating an in-focus state by light and another mode of indicating an in-focus state by sound. The intensity of the in-focus indication by light is arranged to be unvarying, while the intensity of the in-focus indication by sound is arranged to be variable.

Referring to FIG. 6, a photo-taking lens unit 31 includes a focus adjusting lens 31a. A focus adjustment driving device 32 includes a focus adjustment driving motor 32a and a driving control circuit 32b which controls the driving action of the focus adjustment driving motor 32a. A focus detecting unit 33 includes a beam splitter 33a and a focus detecting sensor array 33b.

A camera controlling microcomputer 34 includes therein a (CPU not shown), a RAM 34a which is arranged to store information of varisus kinds, a ROM 34b in which an action controlling program is written, an A/D converter 34c which is provided for receiving analog signals outputted from the sensor array 33b, and PWM control circuits 34d and 34e. The PWM control circuit 34d corresponds to the indication intensity varying means mentioned in the foregoing. In the program which is written in the ROM 34b, a part of the program arranged to decide an indication intensity corresponds to indication intensity deciding means.

A switch SW1 is provided for starting an automatic focusing action and is arranged to be turned on by a first stroke of operation of a release button. A switch SW2 is provided for starting a release action and is arranged to be turned on by a second stroke of operation on the release button.

Indicating means 35 is provided for indicating an in-focus state by a sound and includes a sound generator 35a and a driving circuit 35b which is arranged to drive the sound generator 35a. Indicating means 36 is provided for indicating an in-focus state by light and includes an LED 36a and an LED driving circuit 36b which is arranged to drive the LED 36a. An exposure control device 37 includes a shutter 37a and a shutter driving circuit 37b which is arranged to drive the shutter 37a.

Figure 7:
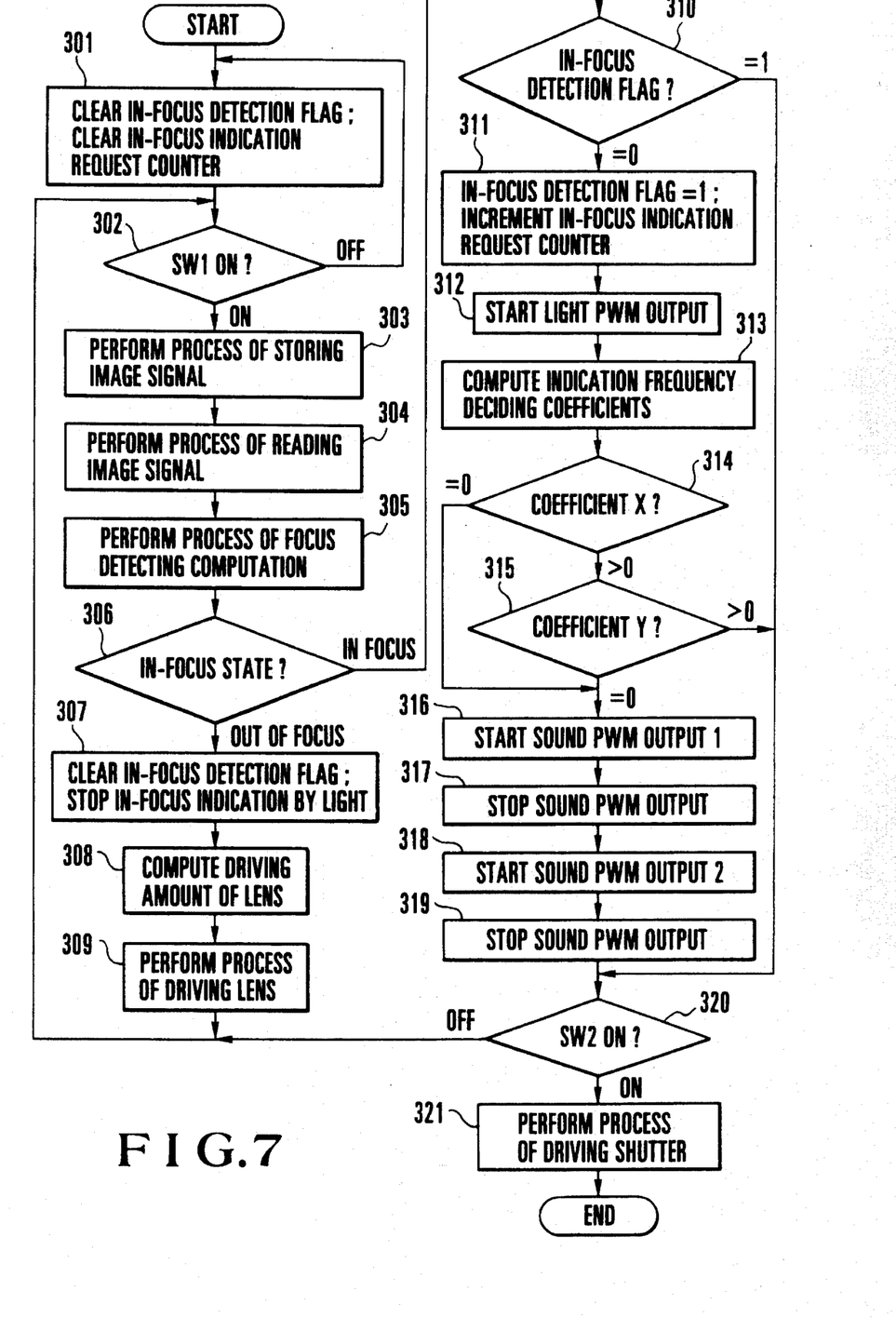
FIG. 7 is a flow chart showing the operation of the camera shown in FIG. 6.

FIG. 7 is a flow chart showing the operation of the camera which is arranged as described above. The operation is described with reference to the flow chart as follows: The flow of operation begins from a step 301 when a power supply switch which is not shown is turned on. At the step 301, the microcomputer 34 clears an in-focus detection flag and an in-focus indication request counter which are allocated at predetermined addresses of the built-in RAM 34a and thus sets them respectively at "0".

At a step 302, the microcomputer 34 checks the state of the switch SW1 which is provided for starting the automatic focusing action. If the switch SW1 is found to be not in its on-state, the flow of operation comes back to the step 301. If the switch SW1 is found to be in its on-state, the flow comes to a step 303.

At the step 303, the microcomputer 34 instructs the focus detecting sensor array 33b to store an incident image coming through the photo-taking lens unit 1 and the beam splitter 33a until a predetermined condition is satisfied. At a step 304, the microcomputer 34 takes into it a group of analog images outputted from the focus detecting sensor array 33b through the A/D converter 34c and stores them at predetermined addresses of the RAM 34a.

At the step 305, the microcomputer 34 performs a focus detection computing process by using the data of the image signals stored by the step 304. At a step 306, a check is made to find if the amount of focus deviation which is obtained by the step 305 is less than a predetermined focal depth. If so, an in-focus state is judged to have been attained and the flow branches to a step 310. If the amount of focus deviation is found to exceed the predetermined focal depth, the result of the check is judged to represent an out-of-focus state and the flow comes to a step 307.

At the step 307, since the result of the check for an in-focus state is found to represent an out-of-focus state, the in-focus detection flag is cleared to "0". The PWM output of the PWM control circuit 34e is brought to a stop to terminate light emission of the LED 36a caused by the LED driving circuit 36b. At a step 308, the amount of focus deviation computed by the focus detection computing process of the step 305 is converted, by using the defocus sensitivity of the focus adjusting lens 31a, into a driving amount to which the focus adjusting lens 31a is to be driven. At a step 309, the microcomputer 34 sends information on the lens driving amount to the focus adjustment driving device 32. In accordance with this, the driving control circuit 32b controls and causes the focus adjustment driving motor 32a to drive the focus adjusting lens 31a as much as the driving amount set.

After that, the flow comes back to the step 302 to repeat the processes of focus detection.

If the amount of focus deviation is found to be less than the predetermined focal depth by the step 306, the flow branches to the step 310 as mentioned above.

At the step 310, with an in-focus state judged to have been attained (at the step 306), the in-focus detection flag is checked for confirmation as to whether the result of previous focus detection made the last time shows an in-focus state or an out-of-focus state. If the in-focus detection flag is found to be at "1", the flow branches to a step 320. If the in-focus detection flag is found to be at "0", the flow comes to a step 311.

At the step 311, the count value of the in-focus indication request counter which is arranged to store the number of times for which requests for an in-focus indication have been generated since commencement of the automatic focusing action (after the switch SW1 was turned on) is incremented by one. At the same time, the in-focus detection flag is set at "1" and is stored.

At the step 312, the microcomputer 34 sets the output frequency of the built-in PWM control circuit 34d at 500 KHz and sets its duty ratio at 50%. The PWM output of the PWM control circuit 34e then begins to be supplied to the LED driving circuit 36b. This causes the LED driving circuit 36b to apply a driving signal to the LED 36a. As a result, an in-focus indication by light begins.

At a step 313, the microcomputer 34 computes indication frequency deciding coefficients X and Y by using the value of the in-focus indication request counter. The coefficient X is the value of a quotient obtained by dividing the value of the in-focus indication request counter by four. The coefficient Y is the value of a residuum obtained when the value of the in-focus indication request counter is divided by four.

At a step 314, the indication frequency deciding coefficient X is checked. If the coefficient X is found to be "0", which means that the in-focus indication request has been made three or less times, the flow branches to a step 316. If the coefficient X is found to be larger than "0", which means that the in-focus indication request has been made at least four times, the flow comes to a step 315. At the step 315, the indication frequency deciding coefficient Y is checked. If the coefficient Y is found to be "0", which means that the number of times for which the in-focus indication request has been made is a multiple of four, the flow comes to the step 316. If the coefficient Y is found to be larger than "0", thus showing that the number of times for which the in-focus indication request has been made is a value other than multiples of four, the flow branches to the step 320. At the step 316, the microcomputer 34 begins to supply the PWM output of the PWM control circuit 34d to the driving circuit 35b. This causes the driving circuit 35b to apply a driving signal to the sound generator 35a. As a result, an in-focus indication by sound begins. The microcomputer 34 allows the in-focus indication by sound to last for a period of 32 ms.

At a step 317, the microcomputer 34 stops the PWM output outputted by the step 316 to suspend the in-focus indication by sound. Further, the microcomputer 34 allows the suspension of this in-focus indication to last just for 32 ms. At a step 318, the microcomputer 34 begins to supply the PWM output of the built-in PWM control circuit 34d to the driving circuit 35b in the same manner as the step 316. This causes the driving circuit 35b to apply a driving signal to the sound generator 35a. As a result, the in-focus indication by sound begins. The microcomputer 34 allows the in-focus indication by sound to last for 32 ms. At a step 319, the microcomputer 34 stops the PWM output outputted by the step 318 to terminate the in-focus indication by sound.

At the step 320, the microcomputer 34 checks the state of the switch SW2 which is provided for starting the release action. If the switch SW2 is found to be not in its on-state, the flow comes back to the step 302 to resume the processes of focus detection. If the switch SW2 is found to be in the on-state, the flow comes to a step 321 to allow the release action to begin.

At the step 321, the microcomputer 34 sends a shutter driving instruction signal to the shutter driving circuit 37b which is disposed within the exposure control device 37. In accordance with this instruction signal, the shutter driving circuit 37b drives the shutter 37a to have a predetermined part of a film exposed to the light of an object image.

In other words, the arrangement of the third embodiment described above is as follows: The in-focus indication is made both by light and by sound when an in-focus state is attained for the first time and, after that, the in-focus indication by light is alone allowed to continue while the indication by sound is suspended as long as the in-focus state continues. In a case where the first in-focus state comes to change to an out-of-focus state and, after that, an in-focus state is attained again, the in-focus indication is made both by light and by sound every time an in-focus state is attained again. However, after the change from an in-focus state to an out-of-focus state is repeated four times, the in-focus indication by sound is allowed to be made only once in every four occurrences of the change following the fifth change from an out-of-focus state to an in-focus state.

Further, while the third embodiment is arranged to control the indication by sound in the above-stated manner, the indication by light may also be controlled in a manner similar to the sound manner described.

According to each of the embodiments described, the in-focus indication by sound is arranged as follows: The PWM output is set at 50% to generate a large in-focus indicating sound when an in-focus state is detected for the first time, and is set at 10% to give a small sound every time an in-focus state is attained after the first time (in the case of the first embodiment). Further, the in-focus indication by sound is allowed to be made every time an in-focus state is attained as long as the request for an in-focus indication is not made more than three times. However, in a case where the request is made more than four times, the in-focus indication by sound is allowed to be made only once for every four requests for the in-focus indication (in the case of the third embodiment).

Therefore, even in the case of a shooting scene where a fast moving object or an ultra-telephoto lens causes frequent changes between in-focus and out-of-focus states, the embodiment of this invention is capable of informing the camera operator of these changes without making any sound offensive to the ear and without giving any disagreeable feeling to people around the camera.

In the case of the in-focus indication by light, the second embodiment is arranged to set the PWM output at 100% to generate an in-focus indicating light at a high luminance, when an in-focus state is attained for the first time, and at 25% to generate the in-focus indicating light at a lower luminance for in-focus states attained for the second time and thereafter (in the case of the second embodiment). Further, although it is not detailed by the description of the embodiments, the in-focus indication by light may be arranged, like the in-focus indication by sound, for example, to be made every time the request for an in-focus indication occurs up to three times and, in a case where the request occurs more than four times, only once for every four occurrences of the request after the fourth occurrence. The arrangement of varying the frequency of making the indication in this manner enables the camera operator to concentrate his or her attention on a shooting operation without being bothered by the in-focus indicating light within the viewfinder even in cases where in-focus and out-of-focus states frequently alternate with each other, like in the event of a fast moving object or the use of an ultra-telephoto lens which tends to cause shaking of the camera due to hand vibrations.

While this invention is applied to a camera of the kind automatically performing focus adjustment in the case of the embodiments described, this invention is not limited to cameras of this kind but is applicable also to a camera of such a kind that permits manual focusing with the camera arranged to perform focus detection and to determine an in-focus state. Further, this invention applies also to a camera of the kind arranged to obtain a distance to the object of shooting, instead of performing focus detection, and to drive and move a lens to a position corresponding to the object distance detected.

What is claimed is:

1. A focus detecting device arranged to repeatedly detect a state of focus or a camera having said focus detecting device, comprising:

a) a decision circuit arranged to decide whether the state of focus detected is an in-focus state or an out-of-focus state;

b) an indication circuit arranged to make an indication of the in-focus state decided by said decision circuit; and c) a varying circuit for varying the intensity of the indication to be made by said indication circuit, said varying circuit being arranged to determine the intensity of the indication on the basis of the number of times that the in-focus state has been decided by said decision circuit.

2. A device or a camera according to claim 1, wherein said indication circuit is arranged to make the indication of the in-focus state for a predetermined period of time every time a change from the out-of-focus state to the in-focus state is decided by said decision circuit.

3. A device or a camera according to claim 1, wherein said varying circuit is arranged to cause said indication circuit to make the indication at a first intensity if the number of times that the in-focus state has been decided by said decision circuit is less than a predetermined value and to make the indication at a second intensity weaker than the first intensity if said number of times is equal to or greater than the predetermined value.

4. A device or a camera according to claim 1, wherein said indication circuit is arranged to make an aural or visual indication.

5. A focus detecting device arranged to repeatedly detect a state of focus or a camera having said focus detecting device, comprising:

a) a decision circuit arranged to decide whether the state of focus detected is an in-focus state or an out-of-focus state;

b) an indication circuit arranged to make an indication of the in-focus state every time a change from the out-of-focus state to the in-focus state is decided by said decision circuit; and c) a varying circuit for varying the intensity of the indication to be made by said indication circuit, said varying circuit being arranged to determine the intensity of the indication on the basis of the number of times of changes from the out-of-focus state to the in-focus state decided by said decision circuit.

6. A device or a camera according to claim 5, wherein said indication circuit is arranged to make the indication of the in-focus state for a predetermined period of time every time a change from the out-of-focus state to the in-focus state is decided by said decision circuit.

7. A device or a camera according to claim 5, wherein said varying circuit is arranged to cause said indication circuit to make the indication at a first intensity if the number of times of changes from the out-of-focus state to the in-focus state decided by said decision circuit is less than a predetermined value and to make the indication at a second intensity if said number of times is equal to or greater than the predetermined value.

8. A device or a camera according to claim 2, wherein said indication circuit is arranged to make an aural or visual indication.

9. Apparatus for use with a focus detecting device arranged to repeatedly detect a state of focus, or for use with a camera having such a focus detecting device, comprising:

a) a processor for determining whether the state of focus detected by the focus detecting device is an in-focus state or an out-of-focus state; and b) an indicator for providing an indication of an in-focus state in response to said processor determining that the in-focus state has been detected;

said processor setting at least a first frequency and a second frequency of the indication of the in-focus state provided by said indicator.

10. Apparatus according to claim 9, wherein said indicator provides an aural or visual indication.

11. A focus detecting device arranged to repeatedly detect a state of focus or a camera having said focus detecting device, comprising:

a) a decision circuit arranged to decide whether the state of focus detected is an in-focus state or an out-of-focus state;

b) an indication circuit arranged to make an indication of the in-focus state decided by said decision circuit; and c) a varying circuit for varying the frequency of making the indication of the in-focus state by said indication circuit, said varying circuit being arranged to vary the frequency of the indication on the basis of the number of times that the in-focus state has been decided by said decision circuit.

12. A device or a camera according to claim 11, wherein said indication circuit is arranged to make the indication of the in-focus state for a predetermined period of time every time a change from the out-of-focus state to the in-focus state is decided by said decision circuit.

13. A device or a camera according to claim 11, wherein said varying circuit is arranged to cause said indication circuit to make the indication at a first frequency if the number of timer that the in-focus state has been decided by said decision circuit is less than a predetermined value and to make the indication at a second frequency less than the first frequency if said number of times is equal to or greater than the predetermined value.

14. A focus detecting device arranged to repeatedly detect a state of focus or a camera having said focus detecting device, comprising:

a) a decision circuit arranged to decide whether the state of focus detected is an in-focus state or an out-of-focus state;

b) an indication circuit arranged to make an indication of the in-focus state every time a change from the out-of-focus state to the in-focus state is decided by said decision circuit; and c) a varying circuit for varying the frequency of making the indication of the in-focus by said indication circuit, said varying circuit being arranged to determine whether or not the indication of the in-focus state is to be made at the time of a change from the out-of-focus state to the in-focus state, on the basis of the number of times of changes from the out-of-focus state to the in-focus state decided by said decision circuit.

15. A device or a camera according to claim 14, wherein said indication circuit is arranged to make the indication of the in-focus state for a predetermined period of time every time a change from the out-of-focus state to the in-focus state is decided by said decision circuit.

16. A device or a camera according to claim 12, wherein, when the number of times of changes from the out-of-focus state to the in-focus state decided by said decision circuit exceeds a predetermined value, said varying circuit causes said indication circuit to make the indication of the in-focus state every time the number of times of changes from the out-of-focus state to the in-focus state reaches a predetermined plural number of times.

17. A device or a camera according to claim 16, wherein said indication circuit is arranged to make an aural or visual indication.

18. A device or a camera according to claim 16, wherein said indication circuit is arranged to make the indication of the in-focus state for a predetermined period of time every time a change from the out-of-focus state to the in-focus state is decided by said decision circuit.

19. A focus detecting device arranged to repeatedly detect a state of focus or a camera having said focus detecting device, comprising:
   a) a decision circuit arranged to decide whether the state of focus detected is an in-focus state or an out-of-focus state;
   b) an indication circuit arranged to make an indication of the in-focus state every time a change from the out-of-focus state to the in-focus state is decided by said decision circuit; and
   c) a varying circuit for varying the frequency of making the indication of the in-focus state by said indication circuit, said varying circuit being arranged to vary the frequency of making the indication of the in-focus state on the basis of the number of times of changes from the out-of-focus state to the in-focus state decided by said decision circuit.

20. Apparatus for use with a focus detecting device arranged to repeatedly detect a state of focus, or for use with a camera having such a focus detecting device, comprising:
   a) a processor for determining whether the state of focus detected by the focus detecting device is an in-focus state or an out-of-focus state; and
   b) an indicator for providing an indication of the in-focus state in response to said processor determining that the in-focus state has been detected;
   said processor causing the indication provided by said indicator to vary on the basis of a number of times that the in-focus state has been determined by said processor.

21. Apparatus according to claim 20, wherein said processor causes the indicator to provide the indication of the in-focus state for a predetermined period of time every time a change from the out-of-focus state to the in-focus state is determined by said processor.

22. Apparatus according to claim 20, wherein said processor causes said indicator (i) to provide the indication at a first intensity if the number of times that the in-focus state has been determined by said processor is less than a predetermined value, and (ii) to provide the indication at a second intensity different from the first intensity if said number of times is equal to or greater than the predetermined value.

23. Apparatus according to claim 20, wherein said indicator provides at least one of an aural or visual indication.

24. Apparatus for use with a focus detecting device arranged to repeatedly detect a state of focus, or for use with a camera having such a focus detecting device, comprising:
   a) a processor for determining whether the state of focus detected by the focus detecting device is an in-focus state or an out-of-focus state; and
   b) an indicator for providing an indication of the in-focus state every time a change from the out-of-focus state to the in-focus state is determined by said processor; and
   said processor causing the indication provided by said indicator to vary on the basis of the number of times of changes from the out-of-focus state to the in-focus state determined by said processor.

25. Apparatus according to claim 24, wherein said processor causes the indicator to provide the indication of the in-focus state for a predetermined period of time every time a change from the out-of-focus state to the in-focus state is determined by said processor.

26. Apparatus according to claim 24, wherein said processor causes said indicator (i) to provide the indication at a first intensity if the number of times of changes from the out-of-focus state to the in-focus state determined by said processor is less than a predetermined value, and (ii) to provide the indication at a second intensity different from said first intensity if said number of times is equal to or greater than the predetermined value.

27. Apparatus according to claim 24, wherein said indicator provides at least one of an aural or visual indication.

28. Apparatus for use with a focus detecting device arranged to repeatedly detect a state of focus, or for use with a camera having such a focus detecting device, comprising:
   a) a processor for determining whether the state of focus detected by the focus detecting device is an in-focus state or an out-of-focus state; and
   b) an indicator for providing an indication of the in-focus state in response to said processor determining that the in-focus state has been detected;
   said processor setting at least a first frequency and a second frequency of the indication of the in-focus state provided by said indicator.

29. Apparatus according to claim 28, wherein said indicator provides at least one of an aural or visual indication.

30. Apparatus for use with a focus detecting device arranged to repeatedly detect a state of focus, or for use with a camera having such a focus detecting device, comprising:
   a) a processor for determining whether the state of focus detected by the focus detecting device is an in-focus state or an out-of-focus state; and
   b) an indicator for providing an indication of the in-focus state in response to said processor determining that the in-focus state has been detected;
   said processor causing a frequency of the indication of the in-focus state provided by said indication circuit to vary on the basis of the number of times that the in-focus state has been determined by said processor.

31. Apparatus according to claim 30, wherein said processor causes the indicator to provide the indication of the in-focus state for a predetermined period of time every time a change from the out-of-focus state to the in-focus state is determined by said processor.

32. Apparatus according to claim 30, wherein said processor causes the indicator (i) to provide the indication at a first frequency if the number of times that the in-focus state has been determined by said processor is less than a predetermined value, and (ii) to provide the indication at a second frequency different from the first frequency if said number of times is equal to or greater than the predetermined value.

33. Apparatus for use with a focus detecting device arranged to repeatedly detect a state of focus, or for use with a camera having such a focus detecting device, comprising:

a) a processor for determining whether the state of focus detected by the focus detecting device is an in-focus state or an out-of-focus state; and b) an indicator for providing an indication of the in-focus state every time a change from the out-of-focus state to the in-focus state is determined by said processor;

said processor (i) causing a frequency of indication of the in-focus provided by said indication circuit to vary, and (ii) determining whether or not the indication of the in-focus state is to be made at the time of change from the out-of-focus state to the in-focus state, on the basis of the number of times of changes from the out-of-focus state to the in-focus state determined by said processor.

34. Apparatus according to claim 33, wherein said processor causes the indicator to provide the indication of the in-focus state for a predetermined period of time every time a change from the out-of-focus state to the in-focus state is determined by said processor.

35. Apparatus according to claim 33, wherein, when the number of times of changes from the out-of-focus state to the in-focus state determined by said processor exceeds a predetermined value, said processor causes said indicator to provide the indication of the in-focus state every time the number of times of changes from the out-of-focus state to the in-focus state reaches a predetermined plural number of times.

36. Apparatus according to claim 35, wherein said indicator provides at least one of an aural or visual indication.

37. Apparatus according to claim 36, wherein said indicator provides the indication of the in-focus state for a predetermined period of time every time a change from the out-of-focus state to the in-focus state is determined by said processor.

38. Apparatus for use with a focus detecting device arranged to repeatedly detect a state of focus, or for use with a camera having such a focus detecting device, comprising:

a) a processor for determining whether the state of focus detected by the focus detecting device is an in-focus state or an out-of-focus state; and b) an indicator for providing an indication of the in-focus state every time a change from the out-of-focus state to the in-focus state is determined by said processor;

said processor (i) causing a frequency of the indication of the in-focus state provided by said indicator to vary, and (ii) causing the frequency of the indication of the in-focus state to vary on the basis of the number of times of changes from the out-of-focus state to the in-focus state determined by said processor.

* * * * *

UNITED STATES PATENT AND TRADEMARK OFFICE
CERTIFICATE OF CORRECTION

PATENT NO.  : 5,528,332  
DATED       : June 18, 1996  
INVENTOR(S) : ETSURO FURUTSU It is certified that error appears in the above-indentified patent and that said Letters Patent is hereby corrected as shown below:

Column 1

Line 19, "obtained. And" should read --obtained and--.  
Line 27, "respect of" should read --respect to--.

Column 3

Line 11, "varisus" should read --various--.  
Line 22, "on a" should read --of a shutter--.  
Line 24, "turned" should read --turned on--.  
Line 27, "an includes" should read --an in-focus state by a sound. The indicating means 5 includes--.

Column 5

Line 56, "varisus" should read --various--.

Column 6

Line 26, "Beam" should read --beam--.  
Line 28, "a a" should read --a--.

UNITED STATES PATENT AND TRADEMARK OFFICE
CERTIFICATE OF CORRECTION

PATENT NO. : 5,528,332

DATED : June 18, 1996

INVENTOR(S) : ETSURO FURUTSU

It is certified that error appears in the above-indentified patent and that said Letters Patent is hereby corrected as shown below:

Column 7

Line 63, "varisus" should read --various--.

Column 12

Line 52, "timer" should read --times--.

Column 13

Line 2, "in-focus" should read --in-focus state--.

Column 14

Line 15, "and" should be deleted.

Signed and Sealed this

Twenty-sixth Day of November 1996

Attest:

BRUCE LEHMAN

Attesting Officer

Commissioner of Patents and Trademarks